(12) United States Patent
Ramsch

(10) Patent No.: US 9,202,092 B2
(45) Date of Patent: Dec. 1, 2015

(54) SYSTEM FOR RFID COMMUNICATION

(71) Applicant: Checkpoint Systems, Inc., Thorofare, NJ (US)

(72) Inventor: Georg Ramsch, Oftersheim (DE)

(73) Assignee: CHECKPOINT SYSTEMS INC., Thorofare, NJ (US)

( * ) Notice: Subject to any disclaimer, the term of this patent is extended or adjusted under 35 U.S.C. 154(b) by 0 days.

(21) Appl. No.: 14/423,019

(22) PCT Filed: Jul. 10, 2013

(86) PCT No.: PCT/EP2013/002029
§ 371 (c)(1),
(2) Date: Feb. 20, 2015

(87) PCT Pub. No.: WO2014/029452
PCT Pub. Date: Feb. 27, 2014

(65) Prior Publication Data
US 2015/0242666 A1    Aug. 27, 2015

(30) Foreign Application Priority Data
Aug. 24, 2012   (DE) .......................... 10 2012 016 655

(51) Int. Cl.
*G06K 7/00*  (2006.01)
*G06K 7/10*  (2006.01)

(52) U.S. Cl.
CPC .................................. *G06K 7/10356* (2013.01)

(58) Field of Classification Search
USPC ................... 235/439; 359/486; 455/41.1, 558
See application file for complete search history.

(56) References Cited

U.S. PATENT DOCUMENTS

2007/0037516 A1* 2/2007 Sawai et al. ................... 455/41.1
2010/0232017 A1* 9/2010 McCarthy et al. ............ 359/486

* cited by examiner

*Primary Examiner* — Allyson Trail
(74) *Attorney, Agent, or Firm* — Nelson Mullins Riley & Scarborough LLP

(57) ABSTRACT

A system for RFID communication includes an antenna device for emitting a wireless signal, and a circuit connected to the antenna device. The antenna device, as a near field antenna, has a dual stripline having a first stripline and a second stripline formed parallel to the first stripline. The antenna device further has a termination, and a balancing element for damping a common mode signal. The balancing element is connected to first connections of the dual stripline, and the termination is connected to second connections of the dual stripline. The circuit is connected to the balancing element for symmetrical emission of the wireless signal to the dual stripline.

14 Claims, 5 Drawing Sheets

SYSTEM FOR RFID COMMUNICATION

CROSS-REFERENCE TO RELATED APPLICATIONS

The present application is a U.S. National Phase Application, and takes the benefit under 35 U.S.C. §371 of international application PCT/EP2013/002029 filed on Jul. 10, 2013, which in turn claims priority to German Patent Application No. 102012016655.9 filed Aug. 24, 2012; the disclosures of which are incorporated herein by reference.

BACKGROUND OF THE INVENTION

1. Technical Field

The present invention relates to a system for RFID communication.

2. Background Information

Antennas are known from "Rothammels Antennnbuch", A. Krischke, 12th edition, 2001. Different forms of antenna are explained on pages 65 to 71. The purpose of the antenna is to convert the line wave coming from the transmitter into the airborne wave or conversely to pick up the airborne wave from the air and to convert it into the line wave which is then passed to the receiver. The antenna is a transmission area which may be envisaged as a spread line. It acts as a matching transformer between line and air. With power adaptation, which is sought in the case of transmission and reception, a travelling wave is formed.

On pages 107 to 111 two-wire cables are explained, which consist of two wires extending parallel, with a small spacing relative to the wavelength. Two-wire cables, or double cables also known as parallel-wire cables, are formed symmetrically to ground. Striplines and microstriplines are explained on page 112. If a loss-free line is terminated at its end with a load resistor which corresponds to the line wave resistor, then the power running into the terminating resistor is completely consumed. This situation is the ideal adjustment. The adjustment factor is the reciprocal value of the ripple. The adjustment factor assumes the value 1 in the event of adjustment and the value 0 in no-load conditions or short-circuit. According to pages 118, 119, power supply lines which transmit high frequency tend to act as antennas. The radiation emitted in their surroundings can cause undesirable directionality and losses. Radiating power supply lines can also give rise to disruptions of the radio and television reception. This side-effect is usually more unpleasant than the low radiation loss. The unwanted radiation from power supply lines is dependent on the one hand upon the structure of the line and on the other hand upon the degree of mismatching on the line, and it increases with increasing ripple. Two-wire cables are symmetrical to ground, both individual conductors have the same cross-section and the same ground conditions. Therefore the currents flowing in both conductors are of equal magnitude, but in opposite directions. The magnetic fields behave in an analogous manner. They would cancel each other out if both conductors were to coincide spatially, but this cannot be achieved in practice. Because of the physical spacing always present between the two conductors the cancellation is not complete. The radiation loss from a two-wire cable increases directly with the square of the conductor spacing and the operating frequency. This means that the conductor spacing should be smaller as the frequency increases.

Balancing elements are explained on pages 145 to 155. If there is a phase rotation of 180°, the synchronized waves cancel each other out and the push-pull waves intensify. A distinction is made between tuned and broadband balancing elements, and between non-transforming and transforming balancing elements. Balancing and transformation are often carried out simultaneously.

In U.S. Pat. No. 7,298,267 B2, a system for RFID communication and for testing is known. In this case, a RF source is designed to provide RF energy to a RFID transponder. The RF source emits a continuous RF signal via a transmission line. Separately from this a coupler for coupling to the RFID transponder and a diode are provided, wherein the diode is coupled to the coupler and an interface. The interface is coupled to the diode and adapted by means of the coupler to modulate the RF energy of the RF source. By the separation of the RF source from the interface, which modulates the RF energy by means of the coupler, a simple arrangement with a plurality of couplers is formed which enables parallel testing of a large number of RFID transponders at high speed.

BRIEF SUMMARY OF THE INVENTION

One aspect of the invention is to provide a system for RFID communication, wherein in particular the susceptibility thereof to interference is improved as much as possible.

Accordingly, a system for RFID communication is provided. The system has an antenna device for emitting a wireless signal. Furthermore the system has a circuit connected to the antenna device. The antenna device as a near field antenna has a dual stripline having a first stripline and a second stripline formed parallel to the first stripline. The antenna device has a termination. The termination serves for the reduction of reflections on the dual stripline. The antenna device has a balancing element for damping a common mode signal. The balancing element is connected to first connections—in particular to a first end—of the dual stripline and the termination is connected to second connections—in particular to a second opposing end—of the dual stripline. The circuit is connected to the balancing element for symmetrical emission of the wireless signal to the dual stripline.

Studies by the applicant have shown that through a specific realization of the system for RFID communication, such as is implemented for example in the drawings, a high degree of resistance to interference can be achieved. Although the antenna device has a limited efficiency of only 5%, nevertheless measurements by the applicant show that the efficiency of 5% is sufficient for reading RFID transponders in the near field. The reading range for RFID transponders is up to 30 cm (approximately one wavelength) with a currently usual sensitivity.

Exemplary dimensions: With a power of 10 mW, which is carried via the feed line to the antenna (conducted power), it is possible to read and to write RFID tags with a sensitivity of approximately −12 dBm to a distance of 10 cm (programming, electronic product code EPC).

Because of a spacing of the first stripline from the second stripline and the symmetrical operation a high magnetic component is achieved in the near field. At the same time, because of the symmetrical operation; the electrical fields cancel each other out in the far field, so that the power in the far field falls significantly. A further advantage is achieved by the balancing element and the termination of the dual stripline, in that interference fields of a remote interference source—for example a further RFID communication system—with predominantly planar wavefronts impinge on the antenna device and thus predominantly generate common mode signals which are eliminated or at least very considerably damped by the balancing element matched to the termination.

According to an advantageous embodiment, the dual stripline has a line wave impedance which is constant along at least one longitudinal region of the dual stripline. This is also designated as longitudinally homogeneous. In this case it is possible to provide a plurality of longitudinal regions separated from one another by lambda/4 elements for emission of the wireless signal. Each longitudinal region for emission of the wireless signal advantageously has a line wave impedance which is constant along the respective longitudinal region. For example, the line wave impedance is constant over the predominant length of the dual stripline. Moreover, the dual stripline cannot have parallel connection regions at their ends. The constancy of the line wave impedance is defined by the manufacturing precision and not by design features, such as variation of the line thickness, line width or the distance between the striplines. For example, in circuit board technology manufacturing tolerances up to 30% are possible.

The antenna device preferably has a flexible carrier. The dual stripline is advantageously formed by conductive tracks on the carrier. In an advantageous embodiment, a ground conductor track can be formed on the rear face of the carrier (coupled microstripline). In another advantageous embodiment, a ground conductor track is formed in the same plane of the dual stripline (coplanar). In a further embodiment no ground areas are provided.

According to an advantageous modification, the dual stripline of the antenna device is disposed in a curved manner. For example, regions of the dual stripline are formed at angles (for example 90°) relative to one another. The dual stripline is advantageously curved over a predominant longitudinal section. An area is preferably predominantly surrounded by the curved dual stripline. The near field is formed within this surface, so that a communication link with RFID transponders can be built up within this area.

In another modification, it is provided that the termination of the antenna device has a plurality of predominantly ohmic termination resistors. For example, the termination resistors are constructed as SMD components which have low parasitic capacitances and inductances.

According to an advantageous embodiment, the circuit has a receiving circuit for receiving signals which are transmitted by a RFID transponder. This enables the reading of information from a memory of the transponder.

In another embodiment, the circuit has a modulator for modulating the wireless signal. To this end, a modulation signal contains the information which is provided for communication and is to be transmitted to the RFID transponder.

In an advantageous modification, it is provided that the balancing element has a transformer. The transformer is also designated as a balun (balanced-unbalanced). Moreover, the transformer is advantageously designed for transformation of the signal to be transmitted.

The first stripline and the second stripline of the dual stripline are preferably spaced apart from one another by at least half a millimeter. The antenna gain/range is dependent upon the spacing between the first stripline and the second stripline.

In a preferred embodiment, a feed line is inserted between the circuit and the balancing element for transmission of the wireless signal from an output of the circuit to the balancing element. The feed line is advantageously a shielded cable, for example, a coaxial cable.

The circuit preferably has a modulation circuit for output of a modulated wireless signal to the balancing element. A modulation signal contains, for example, the information provided for RFID communication with the RFID transponder.

The previously described modification variants are particularly advantageous, both individually, and also in combination. To this end, all the modification variants can be combined with one another. Several possible combinations are explained in the description of the embodiments shown in the drawings. However, these possible combinations of the modification variants illustrated there are not definitive.

BRIEF DESCRIPTION OF THE DRAWINGS

The invention is explained in greater detail below by embodiments with reference to the drawings.

In the drawings.

DETAILED DESCRIPTION OF THE INVENTION

Figure 1:
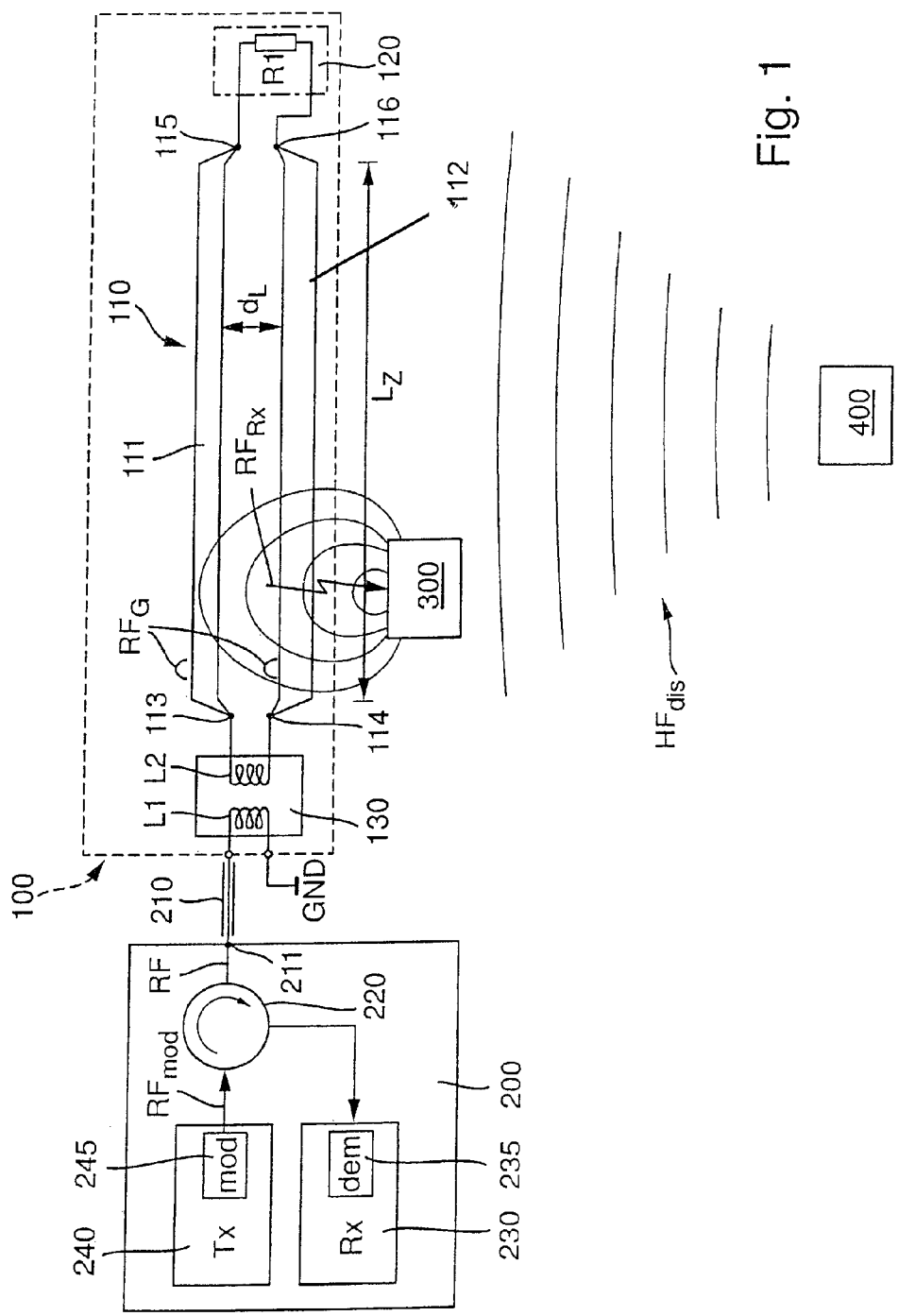
FIG. 1 shows a schematic view of an embodiment of a system for RFID communication.

A first embodiment of a system for RFID communication is shown schematically in FIG. 1. The system has an antenna device 100 and a circuit 200. The antenna device 100 is connected by means of a cable 210, for example, a coaxial cable 210, to the circuit 200. The circuit 200 may also be designated as a reader and facilitates RFID communication with a RFID transponder 300 via the antenna device 100.

The antenna device 100 serves for emitting a wireless signal $RF_{RX}$. The circuit 200 has a connection 211 to which the cable 210 and thus the antenna device 100 is connected. The antenna device 100 is formed as a near field antenna, for RFID communication with RFID transponders 300 at a distance, depending upon the transmission power, of for example ten centimeters. The antenna device 100 of the embodiment according to FIG. 1 has a dual stripline 110 having a first stripline 111 and a second stripline 112 formed parallel to the first stripline over the length L. The first stripline 111 and the second stripline 112 are spaced apart from one another at a spacing $d_L$ of for example half a centimeter. The range of the antenna device 110 is dependent upon the spacing $d_L$ between the first stripline 111 and the second stripline 112. The dual stripline 110 has a line wave impedance which is constant along the length $L_Z$ of the dual stripline 110. This is also designated as longitudinally homogeneous. The dual stripline 110 is formed, for example, as an edge side coupled dual stripline. In connection regions the first stripline 111 and the second stripline 112 are connected to connections 113, 114, 115, 116.

The antenna device 100 has a termination 120 for reduction of reflections on the dual stripline 110. In the embodiment according to FIG. 1, the termination is formed by a terminating resistor R1 which terminates the dual stripline 110 predominantly ohmically with low parasitic inductance and low parasitic capacitance.

Moreover, the antenna device 100 has a balancing element 130. The circuit 200 is connected to the balancing element 130 for symmetrical emission of the wireless signal to the dual stripline 110. The balancing element 130 serves for damping a common mode signal $RF_G$, which is illustrated schematically in FIG. 1 by two in-phase signal components. The common mode signal $RF_G$ is caused for example by a high-frequency interference signal HFdis which originates from an interference source 400. In this case, the interference source 400 is further away from the antenna device 100 and thus is in the far field. The wireless interference signals HFdis of the interference source 400 reach the antenna device 100 as a predominantly planar wavefront and when they impinge on the dual stripline 110 they produce the common mode signal $RF_G$ in the striplines 111 and 112. The balancing element 130 suppresses common mode signals and reduces a so-called reader-reader collision or interference signals of other wireless sources.

By the output of a differential signal to the dual stripline 110, by means of the balancing element 130, a push-pull operation is effected in which each stripline 111, 112 generates a field, wherein an electromagnetic field with a high magnetic component is generated in the near field. On the other hand, a first electrical field of the first stripline 111, and a superimposed second electrical field of the second stripline 112, cancel each other out because of the push-pull operation in the far field. Consequently, if the interferer 400 is a RFID transponder, because of the low far field generated by the antenna device 100 in the push-pull operation, this "interferer transponder" is not activated.

In the embodiment according to FIG. 1, the balancing element 130 is directly connected to first connections 113, 114 on a first end of the dual stripline 110. For example, the balancing element 130 is a transformer (balun) which is connected (for example soldered) to the connections 113, 114. The balancing element 130 may serve at the same time as a capacitive and/or inductive and/or resistive UHF transformer for transformation of the signal RF. In another embodiment, the balancing element 130 is designed to be active, wherein the balancing element 130 advantageously has an amplifier with differential output which emits a differential signal to the dual stripline 110. For example, the amplifier is fastened on a carrier of the antenna device 100 and, for example, is soldered directly onto the first connections 113, 114 of the dual stripline 110.

In the embodiment according to FIG. 1, the balancing element 130 is formed as a transformer which has a first winding L1 and a second winding L2 which are inductively coupled. In the embodiment, according to FIG. 1, the termination 120 is directly connected to second connections 115, 116 on a second end of the dual stripline 110 opposite the first end. For example, the terminating resistor R1 (for example 200 Ohm) is formed as an SMD component which is soldered to the second connections 115, 116. The dual stripline 110 is terminated by the terminating resistor R1 with the lowest possible reflection.

The circuit 200 has a transmitting circuit 240 with a modulator 245 for output of a modulated signal RFmod and a receiving circuit 130 with a demodulator 235. A transmission/reception separator 220, designed, for example, as a circulator, enables separation between a transmitted and received signal. In transmission mode, the signal output from the circuit 200 is a signal RFmod which is generated by modulation and which during the RFID communication with the transponder 300 contains information to be transmitted.

Figure 2:
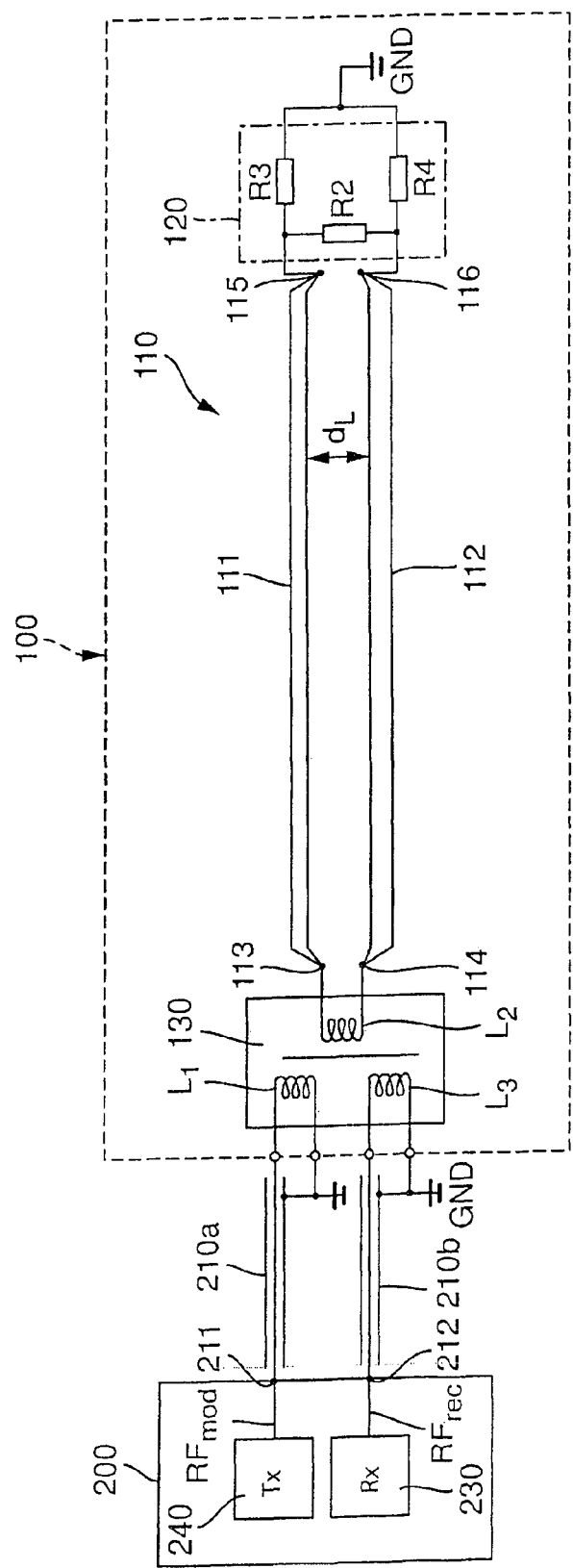
FIG. 2 shows a schematic view of a further embodiment of a system for RFID communication.

A second embodiment is illustrated schematically in FIG. 2. Accordingly, the antenna device has a balancing element 130 which is connected to first connections 113, 114 of a dual stripline 110. The balancing element 130 is constructed as a transformer. In the embodiment according to FIG. 2, the balancing element 130 has two first windings L1 and L3, which are respectively connected by means of coaxial cables 210a, 210b to a transmitting circuit 240 or to a receiving circuit 230 of a circuit 200. The transmitting circuit 140 of the circuit 200 emits a modulated transmission signal RFmod. On the other hand, the received signal RFrec is applied to the receiving circuit 230. The balancing element 130 has a second winding L2 which is connected to first connections 113, 114 of a dual stripline 110. Instead of the transformer illustrated in FIG. 2, as an alternative, the balancing element 130 has, separately, a transformer for the transmission path and a transformer for the reception path.

According to FIG. 2 the antenna device has a termination 120, which has three termination resistors R2, R3 and R4, wherein the termination resistors R3 and R4 are connected to ground GND and to second connections 115, 116 of the dual stripline 110.

Figure 3:
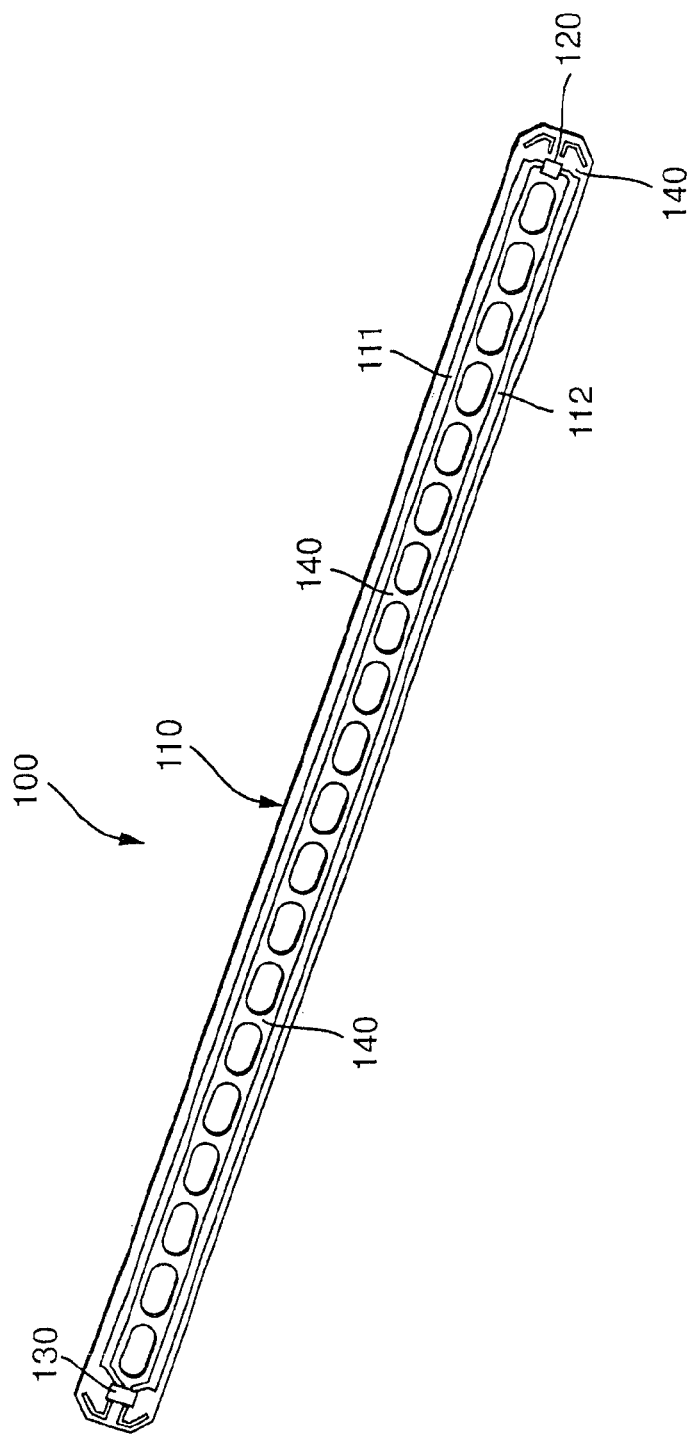
FIG. 3 shows a schematic view of an antenna device of a system for RFID communication.

A design of an antenna device 100 is illustrated schematically in the embodiment according to FIG. 3. A first stripline 111 and a second stripline 112 of a dual stripline 110 are constructed as copper conductive tracks on a flexible circuit carrier 140. Likewise, the balancing element 130 and the termination 120, which, in the embodiment according to FIG. 3, are formed by components which for assembly are soldered onto copper conductive tracks on the circuit carrier 140, are constructed on the circuit carrier 140. The spacing between the first and second stripline 111, 112 can be defined by lithographic processes in the production of the copper conductive tracks. Likewise, it is possible for the striplines 111, 112 to be formed by wires, which by means of design features (spacers etc.), have a high constancy of the spacing between the two striplines 111, 112 over the length of the dual stripline 110.

Figure 4:
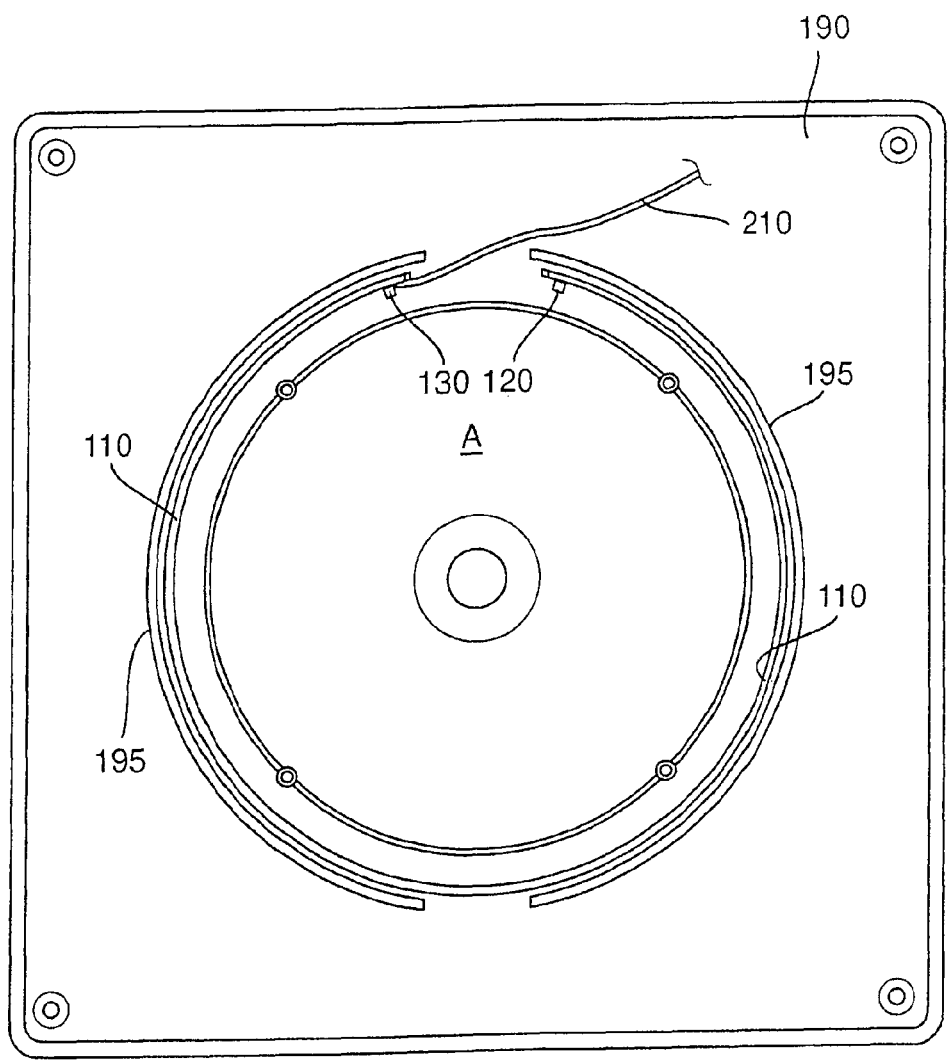
FIG. 4 shows a schematic view of an antenna device of a system for RFID communication in a holder.

FIG. 4 shows an antenna device 100 which is fitted in a holder 190. Because of the flexibility of the antenna device 100, the dual stripline 110 of the antenna device 100 is arranged in shaping elements 195 of the holder 190 in a curved (for example round) manner. In the embodiment according to FIG. 4, the dual stripline 110 is curved over its entire length. An area A is predominantly surrounded by the curved dual stripline 110. In this case, the first stripline and the second stripline are also formed parallel in the region of the curvature. No linear emission of the antenna signal is effected by the curvature. The electrical field of the antenna signal is emitted in a circular or elliptical manner due to the curvature. The antenna, generally embodied as a dipole antenna, of a transponder to be read by means of the emitted antenna signal has a random orientation depending upon the position. Due to the curvature of the dual stripline, and the circular or elliptical emission of the electrical field effected thereby, the transponder can be read with any orientation of the dipole antenna.

In the embodiment according to FIG. 4, due to the curvature the dual stripline 110 forms a loop which is not completely closed and which partially, but predominantly, surrounds the surface A. Moreover, the magnetic field of the antenna signal is concentrated by the loop in the region above and, optionally, below the surface A, so that in the near field (approximately up to 1 m–Fresnel field) the transmission to the transponder is significantly improved by comparison with a dual stripline without the formation of a loop.

As an alternative to the representation in FIG. 4, the antenna device 100 can be of rigid construction and can, for example, have a shape which fits into the holder 190. The feed line 210 (cable) to the circuit (not shown) is connected to the antenna device 100 illustrated in FIG. 4 and is led out of the holder 190.

Figure 5:
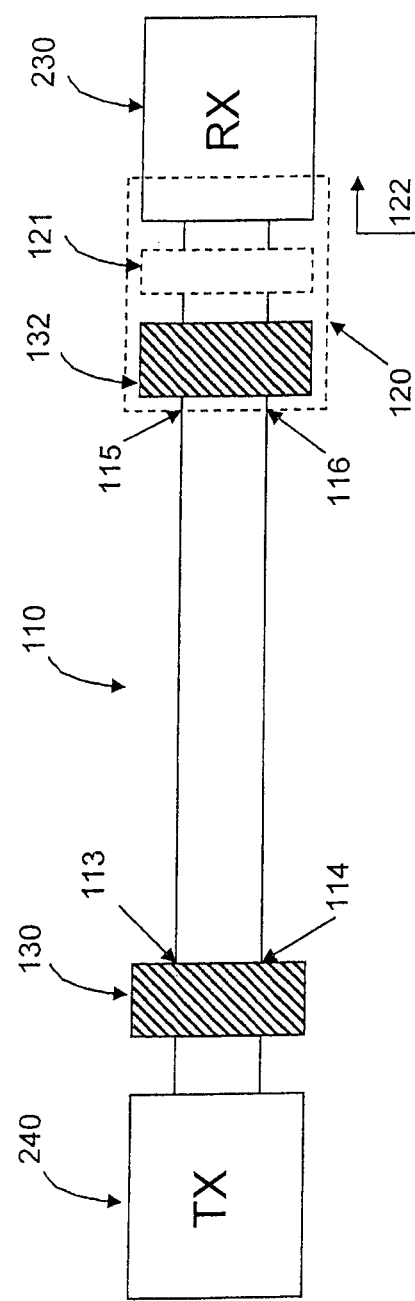
FIG. 5 shows a schematic view of a further embodiment of a system for RFID communication.

A further embodiment of a system for RFID communication is shown schematically in FIG. 5. FIG. 5 shows an antenna device which is constructed as a near field antenna for emission of a wireless signal and has a dual stripline 110 having two parallel lines.

A circuit comprising a transmitting circuit 240 and a receiver circuit 230 is connected to the antenna device.

The antenna device has a first balancing element 130 and a second balancing element 132. The first balancing element 130 and the second balancing element 132 can be constructed in synergy as an impedance converter. The balancing elements effect a damping of a common mode signal. In the embodiment according to FIG. 5, the transmission circuit 240 of the circuit is connected to the first balancing element 130 for symmetrical output of the wireless signal to the dual stripline 110.

The first balancing element 130 is connected to first connections 113, 114 of the dual stripline 110. The second balancing element 132 is connected to second connections 115, 116 of the dual stripline 110. In the embodiment according to FIG. 5, the second balancing element 132 is at the same time a component of a termination 120 of the dual stripline 110. Thus, the antenna device has the termination 120 which is connected to the connections 115, 116 of the dual stripline 110. In the embodiment according to FIG. 5, the termination 120 has an input impedance 122 of the receiver circuit 230 and an adjustment network 121 and the second balancing element 132, which minimize the reflection of waves. Input impedance 122, adjustment network 121 and second balancing element 132 coordinated with one another.

In an embodiment which differs from FIG. 5, the receiver circuit 230 can be connected to another location, so that the termination 120 only consists of the second balancing element 132 and the termination network 121 (for example termination resistors), so that the termination network 121 is connected via the second balancing element 132 to the dual stripline 110. In an embodiment which differs from FIG. 5, the input impedance 122 of the receiver circuit 230 is already adapted to a minimum of the reflection factor. In this case, the resistance network 121 can be omitted.

The invention is not limited to the variants illustrated in FIGS. 1 to 5. For example, it is possible to use another balancing element. It is also possible that the antenna device has another geometric form according to the frequency range (UHF, etc.). The functionality of the system according to FIG. 4 can be used particularly advantageously for a point of sale system.

LIST OF REFERENCE SIGNS 100 antenna device
110 dual stripline
111, 112 stripline
113, 114, 115, 116 connection
120 termination
121 termination network
122 input impedance
130, 132 balancing element, transformer
140 circuit carrier
190 antenna housing, holder
195 shaping element
200 circuit, reader
210, 210a, 210b cable
211, 212 connection
220 transmission/reception separator, circulator
230 receiver circuit, RX
235 demodulator
240 transmitting circuit, TX
245 modulator
300 RFID transponder
400 interference source
A surface
$d_L$ spacing
GND ground
HFdis interference signal
L1, L2, L3 winding
$L_Z$ length
R1, R2, R3, R4 resistance
RF, $RF_{RX}$, RFrec, RFmod signal, wireless signal

The invention claimed is:

1. A system for RFID communication, comprising:
an antenna device for emitting a wireless signal, wherein the antenna device has (1) a dual stripline comprising a first stripline and a second stripline formed parallel to the first stripline; (2) a termination; and (3) a balancing element for damping a common mode signal, wherein the balancing element is connected to first connections of the dual stripline and the termination is connected to second connections of the dual stripline; and
a circuit connected to the antenna device, wherein the circuit is connected to the balancing element for symmetrical emission of the wireless signal to the dual stripline.

2. The system according to claim 1, wherein the dual stripline has a line wave impedance which is constant along at least a longitudinal region of the dual stripline.

3. The system according to claim 1, wherein the antenna device has a flexible carrier.

4. The system according to claim 1, wherein the dual stripline of the antenna device is curved.

5. The system according to claim 4, wherein an area is predominantly surrounded by the curved dual stripline.

6. The system according to claim 4, wherein the curved dual stripline is constructed in the form of an open or closed loop.

7. The system according claim 4, wherein a predominant longitudinal region of the dual stripline has a curvature.

8. The system according to claim 1, wherein the termination of the antenna device has a plurality of predominantly ohmic termination resistors.

9. The system according to claim 1, wherein the circuit has a receiving circuit for receiving signals which are transmitted by a RFID transponder.

10. The system according to claim 1, wherein the balancing element has a transformer.

11. The system according to claim 1, wherein the first stripline and the second stripline of the dual stripline are spaced apart from one another by at least half a millimeter.

12. The system according to claim 1, wherein a feed line is inserted between the circuit and the balancing element for transmission of the wireless signal from an output of the circuit to the balancing element.

13. The system according to claim 1, wherein the circuit has a modulation circuit for output of a modulated wireless signal to the balancing element.

14. A near-field antenna device for emitting a wireless signal in an RFID communication system, the antenna device comprising:
a dual stripline having a first stripline and a second stripline formed parallel to the first stripline;
a termination; and
a balancing element for damping a common mode signal;
wherein the balancing element is connected to first connections of the dual stripline and the termination is connected to second connections of the dual stripline; and
wherein the balancing element is configured to connect to a circuit for symmetrical emission of the wireless signal to the dual stripline.

* * * * *